United States Patent [19]

Glicksman

[11] 3,949,103

[45] Apr. 6, 1976

[54] NON-AQUEOUS GELLED COMPOSITIONS

[75] Inventor: Martin Glicksman, Valley Cottage, N.Y.

[73] Assignee: General Foods Corporation, White Plains, N.Y.

[22] Filed: Nov. 9, 1973

[21] Appl. No.: 414,556

Related U.S. Application Data

[63] Continuation-in-part of Ser. No. 129,182, March 29, 1971, abandoned.

[52] U.S. Cl. .............................. 426/573; 426/650
[51] Int. Cl.² ..................... A23L 1/04; A23L 1/226
[58] Field of Search ............ 426/167, 350; 106/189

[56] References Cited
UNITED STATES PATENTS

| | | | |
|---|---|---|---|
| 2,065,664 | 12/1936 | Dickie et al. ........................ | 106/189 |
| 2,935,408 | 5/1960 | Steinitz ............................... | 426/167 |
| 3,493,383 | 2/1970 | Ryan .................................... | 426/167 |

*Primary Examiner*—Jeanette M. Hunter
*Attorney, Agent, or Firm*—Thaddius J. Carvis; Daniel J. Donovan

[57] ABSTRACT

A non-aqueous gelled composition comprising primarily a mixture of edible flavoring, polyhydric alcohols selected from the group consisting of propylene glycol and 1,3-butylene glycol and alkyl cellulose ethers which gelled products may be employed as an intermediate moisture food filling or flavor-enhancing composition.

9 Claims, No Drawings

NON-AQUEOUS GELLED COMPOSITIONS

RELATED APPLICATION

This application is a continuation-in-part of co-pending application, Ser. No. 129,182 filed Mar. 29, 1971 now abandoned entitled "Non-Aqueous Gelled Compositions".

BACKGROUND OF THE INVENTION 1. field of the Invention

This invention relates to the production of novel gelled compositions having rheological properties which allow widespread usage of the compositions in edible systems. For example, the compositions may be utilized in food systems to fix flavors in the same manner that gelatin is used, or as a carrier in the same system for flavor ingredients. Due to the fact that these gel compositions are devoid of water, intermediate moisture gel compositions may be utilized in the preparation of intermediate moisture foodstuffs such as intermediate moisture fillers, texture modifiers, or as fortified flavor enhancing materials and the like.

Generally, it is known that certain alkyl cellulose ethers when combined with specific polyhydric alcohols and water may be employed to produce extrudable, water soluble gels appropriate for use as medicinal ointments as taught in U.S. Pat. No. 2,550,622, gelatinous filaments as disclosed in U.S. Pat. Nos. 2,065,664 and 2,072,102, gelatinous capsules as taught in U.S. Pat. No. 3,395,202. However, for the most part, the film forming properties of these alkyl cellulose ethers has been demonstrated by the presence of water whether by a predispersion in water prior to incorporation with a polyhydric alcohol or by admixture of the cellulose compound in an aqueous solution of the same.

SUMMARY OF THE INVENTION

It has now been discovered that a novel means for producing non-aqueous, water-soluble gelled products appropriate for use in edible systems is available. Thus, by reacting a mixture composed principally of edible polyhydric alcohols selected from the group consisting of propylene glycol and 1,3-butylene glycol and alkyl cellulose ethers at elevated temperatures, a non-aqueous water soluble gelled composition characterized by good rheological properties is produced. The quality, clarity and gel strength of these compositions will depend upon such factors as the relative amounts and types of alkyl cellulose ethers and whether or not propylene glycol or 1,3-butylene glycol is used alone, with each other, or in admixture with glycerol, which contributes a plasticising effect. The quality of these gelled products are also a function of the time and temperature of heating. In all instances, however, thermal gelation as opposed to gelation at ambient temperature or below is involved. As a consequence, specific variations in the conditions of reaction and in the relative amounts and proportions of the ingredients will result in more specific gels of varying degrees of clarity, gel strength, water solubility and the like. In general, however, the smaller the quantity of alkyl cellulose ethers per amount of polyhydric alcohol, the less rigid the gel.

The invention is especially useful when the edible non-aqueous, water-soluble gelled products are employed in intermediate moisture food systems where stability and, therefore, the absence of additional water is essential.

The principal object of the invention is to prepare edible non-aqueous water-soluble gelled products by reacting propylene glycol and/or 1,3-butylene glycol with an alkyl cellulose ether at elevated temperatures. The alkyl cellulose ethers contemplated within the purview of this invention will be those selected from the group of methyl cellulose, hydroxyethylcellulose, hydroxypropylmethyl-cellulose and mixtures thereof.

Another object of the invention is to develop nonaqueous water soluble gelled compositions having rheological properties which enable utilization of the compositions as intermediate moisture food products such as fillings, puddings and various other intermediate moisture confections.

A yet further object of the invention is to develop edible non-aqueous water soluble gelled compositions which, when mixed with a flavoring, can be employed as flavor carriers and/or flavor enhancers.

Other objects and advantages of the invention will become apparent in the description and examples hereinafter appearing.

DETAILED DESCRIPTION OF THE INVENTION

The process of producing the novel edible non-aqueous based water-soluble compositions of this invention essentially entail heating a solution, suspension, or mixture of propylene glycol and/or 1,3-butylene glycol with an alkyl cellulose ether and subsequently removing the heat to permit gelation to develop. The heating step is conducted on a mixture having about 0.1 to 10 parts by weight of the alkyl cellulose ether to about 90 to 99.9 parts by weight of the propylene glycol; however, neither the amount of any of the compounds nor the cumulative amount of these compounds are critical to the development of the water soluble gelled compositions. The effect of varying the individual as well as the cumulative quantities of the compounds with respect to each other, and as relates to the quantities per weight of solution or mixture merely functions to alter or modify the nature, gel strength, density and overall quality of the water soluble gelled product. What is essential is that the reaction be conducted at above ambient temperature on a cellulose ether/polyhydric alcohol composition devoid of water.

The preferred quantities of propylene glycol and methyl cellulose will constitute about 90 to 99 parts by weight of the glycol and about 1 to 10 parts by weight of the methyl cellulose based upon the total weight of the admixture. Preferential temperature and time conditions for developing the water-soluble gelled compositions will constitute heating at about 185° – 190°C for about 5 minutes. However, these conditions are not critical and any heating of the above compounds in the mixture for a period of time sufficient to develop the desired gelation after cooling will suffice.

The invention will now be described by reference to specific examples.

EXAMPLE I

Approximately 10 parts by weight of methyl cellulose (4000 cps) is admixed with about 100 parts by weight of propylene glycol to form a slurry. The slurry is heated on a hot plate up to about 190°C with constant stirring to avoid scorching. The mixture is stirred until the solids are dissolved and the mixture is a homogeneous mass. The heat source is removed and the admixture is allowed to cool at room temperature to form a thick, clear rigid gel which is soluble in water.

The rigidity or hardness of the gel formed according to this example makes the gel especially useful as a carrier for flavoring ingredients in foodstuffs and as a flavor fixer in much the same way as gelatin is currently employed.

Alternatively, utility for the product may be found in the beverage area when the product is fortified by the addition of powdery beverage admixtures prior to gelation and subsequently dissolved in water or milk as comminuted particles or as flavored straws or flavored stirring rods.

EXAMPLE II

Same as Example I except that 1 part by weight of the methyl cellulose is admixed with 100 parts by weight of the propylene glycol, and upon cooling a soft gel which is especially suitable as a foodstuff intermediate moisture filling having good shelf stability and various textural and optical properties. Thus, adding pregelatinized potato starch prior to the heating step in an amount of about 20% by weight based upon the propylene glycol, produces a relatively firm opaque gel upon cooling. Other fillers such as dextrose, mannitol, xylitol, sorbitol and various other starches may be similarly employed to provide gels of varying properties. Starches being understood herein to also embrace pregelatinized starches.

EXAMPLE III

Same as Example I and II, except that 1,3-butylene glycol is used in lieu of propylene glycol to produce gels having a greater degree of clearness or clarity than those containing propylene glycol.

EXAMPLE IV

Same as Example I and II except that a mixture of equal amounts of propylene glycol and 1,3-butylene glycol is employed in lieu of propylene glycol.

It will be appreciated in the context of this invention that a minor amount of glycerol may be incorporated into the edible polyhydric alcohol as a plasticizer ranging from about 5 to 25 percent by weight of the alcohol; preferably in amounts of about 10 percent. Moreover, the manner of this addition may be effected either before, during or after the heating step.

Among the alkyl cellulose ethers contemplated for use in the invention either alone or in any combination are: methyl cellulose, hydroxyethyl-cellulose and hydroxypropylmethylcellulose. Ethylcellulose and hydroxypropylcellulose do not work.

Although the invention has been described by reference to various specific examples, it will be understood that the inventive concept is not limited thereto, and that many applications of the inventive concept, to include employing aforementioned alkylcellulose ethers of varying viscosities, may be practiced without departure from the spirit, scope and tenor of the invention, which is defined in the appended claims below.

What is claimed is:

1. A process for preparing an edible non-aqueous water-soluble flavor enhancing gel composition for use in food systems consisting essentially of mixing a flavoring and 0.1–10 parts by weight of an alkyl cellulose selected from the group consisting of methyl cellulose, hydroxy-ethylcellulose, hydroxy-propylmethylcellulose and mixtures thereof with 90–99 parts by weight of an edible polyhydric alcohol selected from the group consisting of propylene glycol, 1,3-butylene glycol and mixtures thereof, which process comprises heating the mixture up to about 190°C until the solids are dissolved and a homogeneous mixture is obtained; cooling the mixture to ambient temperature to form a thick, clear, rigid, water-soluble gel.

2. The process according to claim 1 wherein the alkyl cellulose ether is methyl cellulose and the edible polyhydric alcohol is propylene glycol.

3. The process according to claim 1 wherein the alkyl cellulose ether is methyl cellulose and the edible polyhydric alcohol is 1,3-butylene glycol.

4. A process for preparing a non-aqueous shelf-stable gelled intermediate moisture food filling consisting essentially of mixing 0.1 – 10 parts by weight of an alkyl cellulose ether selected from the group consisting of methyl cellulose, hydroxy-ethylcellulose, hydroxy-propylmethyl-cellulose and mixtures thereof with 90–99 parts by weight of an edible polyhydric alcohol selected from the group consisting of propylene glycol, 1,3-butylene glycol and mixtures thereof which process comprises heating the mixture up to about 190°C until the solids are dissolved and a homogeneous mixture is obtained; cooling the mixture to ambient temperatures to form a thick, clear, rigid water soluble gel.

5. The process according to claim 4 wherein the alkyl cellulose ether is methyl cellulose and the edible polyhydric alcohol is propylene glycol.

6. The process according to claim 5 wherein the alkyl cellulose ether is methyl cellulose and the edible polyhydric alcohol is 1,3-butylene glycol.

7. A non-aqueous gelled composition consisting essentially of a flavoring, about 0.1 – 10 parts by weight of an alkyl cellulose ether selected from the group consisting of methyl celluloses, hydroxy-ethyl cellulose, hydroxy-propylmethy cellulose and mixtures thereof and about 90–99 parts by weight of an edible polyhydric alcohol selected from the group consisting of propylene glycol, 1,3-butylene glycol and mixtures thereof, which gelled composition is clear, rigid water-soluble, shelf-stable and appropriate for use as an intermediate moisture food filling and flavor-enhancing composition.

8. The composition of claim 7 wherein the alkyl cellulose is methyl cellulose and the polyhydric alcohol is propylene glycol.

9. The composition of claim 7 wherein the alkyl cellulose is methyl cellulose and the polyhydric alcohol is 1,3 - butylene glycol.

* * * * *